Jan. 20, 1942.  E. M. FRAZIER  2,270,371
GAS GAUGE CONNECTION
Filed April 1, 1940

Edward M. Frazier
INVENTOR
BY Victor J. Evans & Co.
ATTORNEYS

Patented Jan. 20, 1942

2,270,371

UNITED STATES PATENT OFFICE 2,270,371

GAS GAUGE CONNECTION

Edward M. Frazier, Miami, Fla.

Application April 1, 1940, Serial No. 327,334

2 Claims. (Cl. 285—8)

The present invention relates to improvements in gas gauges, and more particularly to a means for connecting the same to a gas outlet register.

An important object of the invention resides in the provision of a gas gauge adapted to register the footage of gas in-put in gas appliances, such as stoves, hot water heaters, refrigerators, and the like which are provided with adjustable orifices.

Another object of the invention is to provide a gas gauge having a novel type of coupling through the medium of which it may be connected to a gas outlet orifice, such as found in various gas appliances, said coupling including a flexible tube having a connection at one end to be screw threadedly engaged with the gauge, and a connection at the other end thereof adapted to be slipped on gas outlet orifice nozzles of different sizes.

The invention will be fully and comprehensively understood from a consideration of the following detailed description when read in connection with the accompanying drawing which forms a part of the application.

Figure 1:
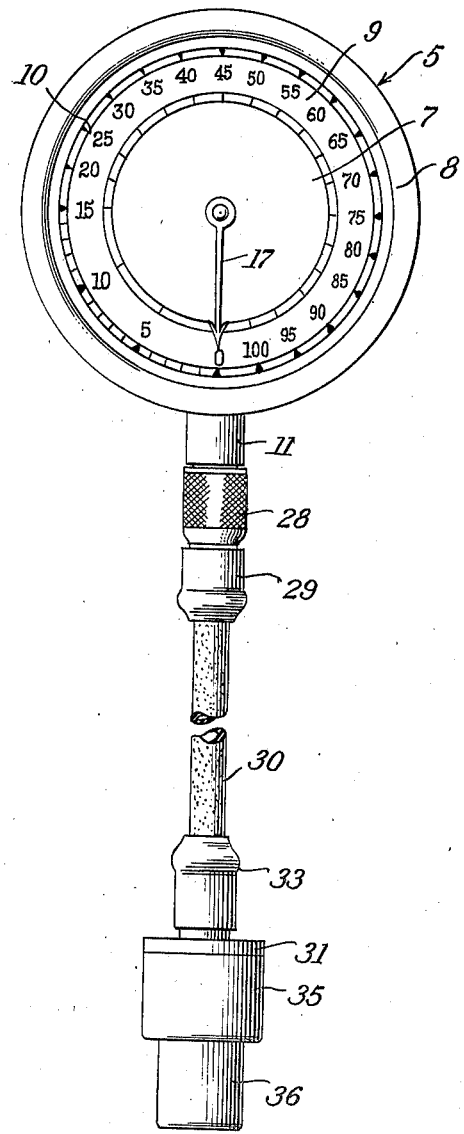
Figure 1 is a front plan view of a gas gauge embodying the features of the present invention.

Referring to the drawing for a more detailed description thereof, the gauge indicated generally by the reference numeral 5 comprises a substantially cylindrical-shaped casing 6 having a transparent cover 7 held in position by means of a detachable ring 8. An indicating dial 9 is mounted within the casing, the same being provided with a series of graduations 10 for registering the footage of gas in-put.

A tubular fitting 11 extends through an opening 12 formed in the bottom of the casing 6 and is attached thereto by screws or other means 13. The fitting 11 extends within the casing and is formed with a passage 14 communicating with an expansible and contractible tube 15, such as is commonly used in pressure gauges and which is secured in any suitable manner to the fitting 11 so as to be in communication with the passage 14 at all times. A member 16 is disposed transversely of the casing 6 and forms a support for the dial 9.

Figure 2:
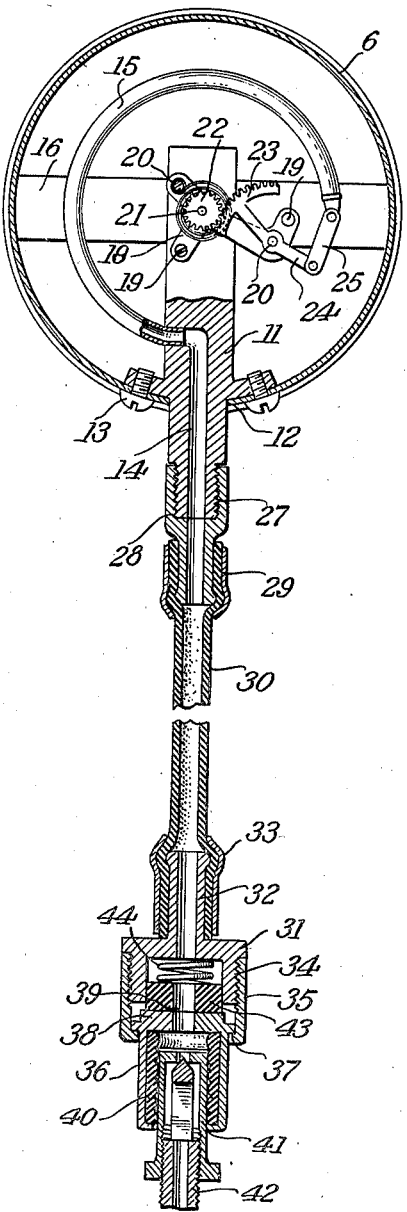
Figure 2 is a vertical sectional view thereof.

The mechanism for operating the pointer 17 is more clearly shown in Figure 2 of the drawing and includes a housing comprising upper and lower plates 18 held in spaced relation, one of which is shown in the drawing. The lowermost plate is attached to the fitting 11 and member 16, as indicated at 19, pins 20 being provided for supporting the plates in spaced relation. A shaft 21 projects from the plate 18 and carries the pointer 17, it being understood that said shaft may be set in jewels, not shown. A gear 22 is also fixedly mounted on the shaft 21 and is in mesh with the segmental-shaped gear 23. An angular arm 24 forms a part of the gear 23, the same being pivoted centrally of its ends on the pin 26 and the free end thereof coupled with a link 25. The opposite end of the link 25 is attached, as indicated, to the free end of the tube 15. The construction just described will function to move the pointer 17 over the face of the dial 9 upon expansion of the tube 15. As the tube expands, the link 25 will be raised causing the arm 24 to swing on its pivot 20 to move the gear 22 through the gear 23.

The lower end of the fitting 11 is exteriorly threaded as indicated at 27 for receiving the interiorly threaded connection 28 suitably held by a clamp 29 on the upper end of a flexible tube 30. The tube 30 is formed of rubber or other flexible material which permits use of the gauge in places that are not readily accessible to other pipes and gauges. The lower end of the tube 30 carries a coupling 31, the neck portion 32 thereof being disposed within the end of the tube 30 and held therein by means of a clamp 33. The coupling 31 is of hollow formation and is provided with exteriorly formed threads 34 for threadedly receiving a cap 35. The cap 35 forms the means of retaining the hollow plug 36, the same being supported by means of the inwardly extending flanges 37 formed integral with the cap 35. The upper end 38 of the plug 36 is formed with a passage 39 in communication with the stem 32 so as to allow free and unobstructed passage of gas through the tube 30 and into the fitting 11. The plug 36 frictionally retains a rubber insert 40 adapted to be slidably disposed over the adjustable cap 41 of a gas fitting 42. The gas fitting 42 and cap 41 are of conventional construction, it being understood that the cap 41 is movable on the fitting 42 for adjusting the flow of gas through the end of said fitting. A flexible washer 43 and backing spring 44 maintain a tight fitting when the plug 36 is positioned over the cap 41.

It is to be readily understood that the plug 36 carrying the rubber insert 40 is readily and easily applied to a gas fitting whereby connection is made between the gauge and said fitting. When testing the footage of gas in-put in various gas appliances, the coupling 31 and its associated mechanism are placed over the gas fitting and frequently said fitting is inaccessibly positioned. The tube 30 being formed of flexible material is readily bent so that a reading of the gauge can be obtained even though the position of the fitting be at various angles to the gauge. The coupling 31 can be readily interchanged for a coupling of a larger size for use with larger-sized fittings.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawing nor to the precise construction described and, therefore, such changes and modifications may be made therein as do not effect the spirit of the invention nor exceed the scope thereof as expressed in the appended claims.

What is claimed is:

1. In a connection of the character described, a cylindrical coupling section open at one end and having a reduced central outlet in the opposite end, a tubular neck connected with and extending axially from the said outlet, the cylindrical wall of the said coupling being exteriorly screw threaded, a tubular cap having its inner portion threadedly fitted about the coupling and having an inturned flange at its outer end, a tubular plug having an end wall at its inner end provided with a central outlet and having an annular flange disposed within the flange of the cap, a compressible liner fitted within the said plug and adapted to frictionally engage a feed nipple therein, an annular packing member slidably fitted within the coupling having a center bore in alignment with the outlet in the inner end of the said plug, and a spring mounted between the end wall of the coupling and the annular packing member yieldingly forcing the said packing member against the inner end of the plug and the flange of the plug against the flange of the connecting cap.

2. In a gauge attaching connection for gas appliances, a cylindrical coupling member open at one end and having a center outlet in the opposite closed end, a tubular neck formed integral with the outlet portion of the coupling and extending axially outward thereof, the said neck having an enlarged rim portion at its outer end, a connecting tube fitted upon the said neck, a clamp removably holding the said tube on the neck, a cylindrical cap having its inner portion threadedly connected with the exterior of the cylindrical coupling and having its outer end spaced from the coupling, an inturned flange formed at the outer end of the said cap, a tubular plug having its outer end open and formed with an inturned flange and having its inner closed end fitted within the outer end portion of the cap and provided with a reduced center outlet, the inner closed end of the said plug having a circumferential flange fitted within and abutting the flange at the outer end of the cap, a tubular liner of compressible material fitted within the outwardly projecting portion of the plug and adapted to frictionally engage the gas feed nipple of a gas appliance, an annular packing member slidably fitted within the cylindrical coupling and having a central bore disposed in alignment with the outlet in the inner end of the plug, and a coil spring fitted within the coupling between the end wall thereof and the packing member yieldingly urging the packing member against the inner end of the plug and the plug flange against the flange of the connecting cap.

EDWARD M. FRAZIER.